(12) United States Patent
Jones (10) Patent No.: US 10,009,379 B2
(45) Date of Patent: Jun. 26, 2018

(54) SYSTEMS AND METHODS FOR STERILIZING EMAIL ATTACHMENTS AND OTHER COMMUNICATIONS DELIVERED BY EMAIL

(71) Applicant: Peter W. J. Jones, Belmont, MA (US)

(72) Inventor: Peter W. J. Jones, Belmont, MA (US)

(73) Assignee: Peter W. J. Jones, Belmont, MA (US)

( * ) Notice: Subject to any disclaimer, the term of this patent is extended or adjusted under 35 U.S.C. 154(b) by 0 days. days.

(21) Appl. No.: 14/977,435

(22) Filed: Dec. 21, 2015

(65) Prior Publication Data

US 2016/0182532 A1  Jun. 23, 2016

Related U.S. Application Data

(60) Provisional application No. 62/096,263, filed on Dec. 23, 2014.

(51) Int. Cl.
*H04L 29/06* (2006.01)

(52) U.S. Cl.
CPC .......... *H04L 63/20* (2013.01); *H04L 63/0428* (2013.01); *H04L 63/145* (2013.01); *H04L 63/18* (2013.01)

(58) Field of Classification Search
CPC ... H04L 63/0428; H04L 63/18; H04L 63/145; H04L 63/20
See application file for complete search history.

(56) References Cited

U.S. PATENT DOCUMENTS

| | | | | |
|---|---|---|---|---|
| 8,301,671 B1* | 10/2012 | Greenwood | ........ | G06F 11/2094 707/813 |
| 2005/0071432 A1* | 3/2005 | Royston, III | .......... | G06F 21/55 709/206 |
| 2009/0063868 A1* | 3/2009 | Granados | .............. | G06F 21/125 713/187 |
| 2010/0005531 A1* | 1/2010 | Largman | ................. | G06F 21/53 726/24 |
| 2010/0299534 A1* | 11/2010 | Shim | ................... | G06F 21/6218 713/189 |
| 2013/0019096 A1* | 1/2013 | Palzer | ................... | H04L 9/0827 713/168 |
| 2013/0061282 A1* | 3/2013 | Risney, Jr. | ............ | G06F 21/566 726/1 |
| 2013/0067570 A1* | 3/2013 | Risney, Jr. | ............ | G06F 21/566 726/22 |
| 2016/0323107 A1* | 11/2016 | Bhogal | ................. | H04L 9/3247 |
| 2017/0048257 A1* | 2/2017 | Hamid | ................. | H04L 63/126 |

* cited by examiner

*Primary Examiner* — Hadi Armouche
*Assistant Examiner* — Sher A Khan
(74) *Attorney, Agent, or Firm* — Ropes & Gray LLP (57) ABSTRACT

A system for sterilizing data sent through electronic messages includes first computing circuitry configured to receive a first electronic communication including first data having executable code and generate optical data representative of the first data. The system further includes second computing circuitry configured to receive the optical data from the first computing circuitry, convert the optical data into second data representative of the optical data, and transmit a second electronic communication that includes the second data and omits the first data.

16 Claims, 6 Drawing Sheets

SYSTEMS AND METHODS FOR STERILIZING EMAIL ATTACHMENTS AND OTHER COMMUNICATIONS DELIVERED BY EMAIL

CROSS-REFERENCE TO RELATED APPLICATIONS

This Application claims the benefit under 35 U.S.C. §119(e) of U.S. Provisional Patent Application No. 62/096,263, filed Dec. 23, 2014, which is hereby incorporated by reference herein in its entirety.

BACKGROUND

Email attachments present a hazard and growing threat to computer security for individuals, corporations and governments. Viruses and malware are often embedded in the computer code of attachments to email messages. Computer users are cautioned not to open attachments from unknown senders, but the identification of the sender of the email with an attached file can be spoofed, and social engineering helps create emails that get recipients to open attachments. Moreover, some departments in corporations routinely receive attachments from unknown individuals that have to be opened in the normal course of business, such as the HR departments receiving resumes in response to job postings.

The result of all this is many hundreds of millions of dollars in damages each year, not to mention corporate and national security espionage and security breaches.

Anti-virus programs can be set up such that all incoming attachments are scanned, but the problem with this approach is that the evolution of new virus and malware threats is so rapid that updates to malware identification software cannot keep up with the new threats, and new forms of malware can get through.

Opening certain types of particularly vulnerable attachments has been banned and users are told not to open any file that they are not specifically expecting to receive. As can be imagined, this well-deserved caution can present a drag to the efficient operation of any organization. Banning the opening of attachments impairs some of the very features that makes email such a powerful and useful tool: an easy and fast way to send documents, spreadsheets, presentations, and the like.

SUMMARY

Therefore, it is useful to devise systems and methods for allowing the safe opening, viewing, and use of email attachments without the possibility of virus or malware infections and intrusions to computers and networks. The systems and methods described herein include, among other things, a system for sterilizing email attachments and other data transmitted by electronic communication. The system may include a non-sterile partition and a sterile partition. The sterile and non-sterile partitions may communicate through an optical link (e.g., a camera receiving images from a monitor) and/or an audio link (e.g., a microphone receiving sound from a speaker) so that executable code cannot be transferred between the partitions. The optical link and/or audio link effectively sterilize data to prevent malware transmission. In implementations having an optical link, the optical link transforms data stored in digital, machine-readable code on a non-sterile partition into light waves. The light waves may be captured by a visual input device on the sterile partition as optical data. The sterile partition may transform the optical data received by the visual input device back to machine-readable code. The transformation of original digital information into patterns of visible light and back to digital information does not allow executable code embedded in the original digital information to remain present in the transformed data on the sterile partition. The optical data received by the sterile partition may be converted to text or some editable format, or may be stored as an image or video file. In implementations having an audio link, the audio link causes digital data stored on the non-sterile partition to be converted into air pressure waves (e.g., sound waves). The air pressure waves may be received on the sterile partition and transformed back into digital data. Executable code hidden in an original audio file is not carried with the air pressure waves and does not enter the sterile partition. Thus, sterilization is performed by a double transformation of digital data to strip hidden executable code from the visual and/or audio data being transmitted.

The sterile partition may include a computer having a connection to a first network and having software programs capable of receiving a first email and opening attachments included in the first email and a display monitor and/or speaker through which the attachments and other information can be transmitted as light waves and/or sound waves. The sterile partition may be isolated from the non-sterile partition and may include a computer having a connection to a second network and a visual input device and/or audio input device configured to capture an image from the display monitor and/or a sound from the speaker. In some implementations, the sterile partition has software programs capable of performing optical character recognition or image capture. The non-sterile partition of the device may be isolated such that it is effectively or actually separate from the main corporate computer network. The computer and software programs may be capable of re-creating a sterile version of the original attachment, and a method of emailing or otherwise sending on the attachment to the originally intended recipient or storing it and notifying the recipient that a sanitized attachment is available. In some implementations, the computer and software programs perform optical character recognition on attachments to produce an editable output file. An editable file of text may be preferable for transmission instead of an image file of the text because editable files may require less memory for storage. There may be no electronic connections between these two partitions, only the optical link and/or audio link provided by the display monitor and the visual input device.

According to one aspect, a system for sterilizing data sent through electronic messages includes first computing circuitry configured to receive a first electronic communication including first data having executable code and generate optical data representative of the first data. The system further includes second computing circuitry configured to receive the optical data from the first computing circuitry, convert the optical data into second data representative of the optical data, and transmit a second electronic communication that includes the second data and omits the first data.

In certain implementations, generating the optical data comprises generating the optical data in a format readable by a monitor. In some implementations, receiving the optical data from the first computing circuitry comprises receiving the optical data from an analog communications link. In certain implementations, receiving the optical data through the analog communications link comprises receiving the optical data through a Video Graphics Array (VGA) cable. In some implementations, converting the optical data into the second data representative of the optical data comprises converting the optical data into the second data using at least one of optical character recognition and an image processing program. In certain implementations, generating the optical data representative of the first data comprises capturing an image representative of the first data that is displayed on a monitor associated with the first computing circuitry. In some implementations, the first computing circuitry is further configured to transmit to the second computing circuitry an indication that the first electronic message was received and is ready for conversion, and converting the optical data into the second data representative of the optical data comprises converting the optical data into the second data representative of the optical data after receiving the indication that the first electronic message was received and is ready for conversion. In certain implementations, the optical data further comprises data representative of at least one of a sender's electronic message address, a file type, a file name, and a file size, and the second computing circuitry is further configured to determine how to convert the optical data into the second data representative of the optical data and to which electronic message address to transmit the second electronic communication based on the data representative of at least one of the sender's electronic message address, the file type, the file name, and the file size. In some implementations, the first computing circuitry is further configured to determine whether a virtual computer associated with the first computing circuitry has been infected with malware and, in response to determining that the virtual computer associated with the first computing circuitry has been infected with malware, erase and reload a portion of the virtual computer associated with the first computing circuitry. In certain implementations, determining whether the first computing circuitry has been infected with malware comprises determining whether the first computing circuitry has been infected with malware when at least one of a fixed time period has passed, a failed checksum has been computed, and an electronic communication has been received.

According to another aspect, a method for sterilizing data sent through electronic messages includes receiving, at first computing circuitry, a first electronic communication including first data having executable code; generating, by the first computing circuitry, optical data representative of the first data; receiving, at second computing circuitry, the optical data from the first computing circuitry; converting, by the second computing circuitry, the optical data into second data representative of the optical data; and transmitting, by the second computing circuitry, a second electronic communication that includes the second data and omits the first data.

In certain implementations, generating, by the first computing circuitry, the optical data comprises generating the optical data in a format readable by a monitor. In some implementations, receiving the optical data from the first computing circuitry comprises receiving the optical data from an analog communications link. In certain implementations, receiving the optical data through the analog communications link comprises receiving the optical data through a VGA (Video Graphics Array) cable. In some implementations, converting, by the second computing circuitry, the optical data into the second data representative of the optical data comprises converting the optical data into the second data using at least one of optical character recognition and an image processing program. In certain implementations, generating, by the first computing circuitry, the optical data representative of the first data includes capturing an image representative of the first data that is displayed on a monitor associated with the first computing circuitry. In some implementations, the method further comprises transmitting to the second computing circuitry, by the first computing circuitry, an indication that the first electronic message was received and is ready for conversion, and converting, by the second computing circuitry, the optical data into the second data representative of the optical data comprises converting the optical data into the second data representative of the optical data after receiving the indication that the first electronic message was received and is ready for conversion. In certain implementations, the optical data further comprises data representative of at least one of a sender's electronic message address, a file type, a file name, and a file size, and the method further comprises determining, by the second computing circuitry, how to convert the optical data into the second data representative of the optical data and to which electronic message address to transmit the second electronic communication based on the data representative of at least one of the sender's electronic message address, the file type, the file name, and the file size. In some implementations, the method further comprises determining, by the first computing circuitry, whether a virtual computer associated with the first computing circuitry has been infected with malware and, in response to determining that the virtual computer associated with the first computing circuitry has been infected with malware, erasing and reloading a portion of the virtual computer associated with the first computing circuitry. In certain implementations, determining, by the first computing circuitry, whether the first computing circuitry has been infected with malware comprises determining whether the first computing circuitry has been infected with malware when at least one of a fixed time period has passed, a failed checksum has been computed, and an electronic communication has been received.

BRIEF DESCRIPTION OF THE DRAWINGS

For purpose of explanation, several embodiments are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form to not obscure the description with unnecessary detail.

In one embodiment of this invention, the device comprises two portions: a "non-sterile" partition and a "sterile" partition. The non-sterile partition may be comprised of a computer with a network connection, software programs that are capable of receiving emails, identifying and opening various attachments, and a display monitor and/or a speaker through which the attachments and other information can be transmitted. The non-sterile partition of the device may be isolated such that it is effectively or actually separated from the main corporate computer network.

The sterile partition may be comprised of a computer, a visual input device for capturing an image from the non-sterile partition's monitor and/or an audio input device for capturing a sound from the non-sterile partition's speakers, software programs capable of performing certain actions, and a network connection over which files and/or emails can be sent. The computer and software programs may be capable of re-creating a sterile version of the original attachment, and a method of emailing or otherwise sending on the attachment to the originally intended recipient or storing it and notifying the recipient that a sanitized attachment is available. The sanitized file can be an image file, a sound file, a text file, or any other suitable file type or format. In certain implementations, the computer and software programs in the sterile partition are capable of performing optical character recognition and/or image recognition on the displayed attachments to generate an editable file format (e.g., a text file). In some implementations, there are no electronic connections between the sterile and non-sterile partitions, only the optical link provided by the display monitor and the visual input device and/or the audio link provide by the speaker and microphone.

Figure 1:
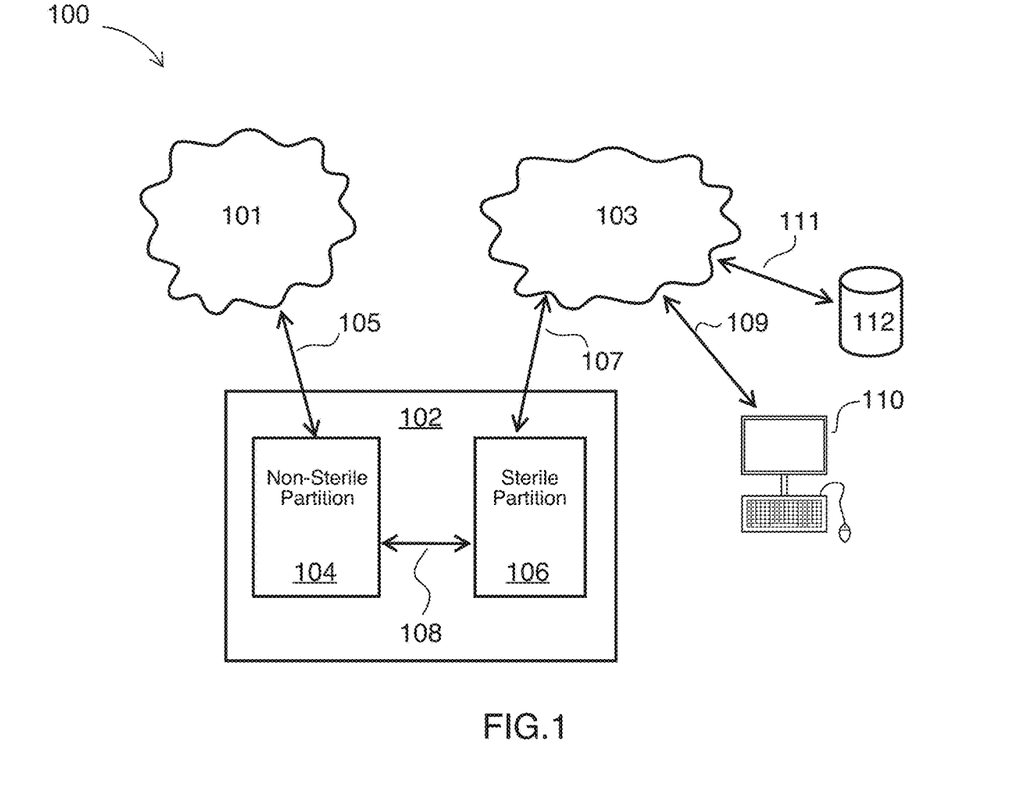
FIG. 1 is an illustrative embodiment of a schematic block diagram of a network environment in accordance with some embodiments of the disclosure.

FIG. 1 is an illustrative embodiment of a schematic block diagram of a network environment 100 in accordance with some embodiments of the disclosure. The network environment includes a first network 101, a sterilization system 102, and a second network 103 connected to a computer workstation 110 and a database 112. The sterilization system 102 includes a non-sterile partition 104 and a sterile partition 106, connected by optical link 108. The non-sterile partition 104 is linked to the first network 101 through a link 105, and the sterile partition 106 is connected to the second network 103 through a link 107. The second network is also connected to the workstation 110 through a link 109 and to the database 112 through a link 111.

The sterilization system 102 may receive data from the first network 101 through the link 105. Specifically, data may be received by the non-sterile partition 104 of the sterilization system 102. The received data may then be processed by the non-sterile partition 104 and transmitted to the sterile partition 106 through optical link 108. The sterile partition 106 may further process the data and transmit the data through link 107 to the second network 103. The data transmitted through link 107 do not contain any malicious executable code that may be hidden in the data received through link 105. Thus, the data transmitted through link 107 are "sterile." The sterile data on network 103 may be accessed from computer station 110 through link 109 or may be stored in database 112 using link 111.

The first network 101 may be a local area network (LAN), a wide area network, or any other suitable network. The second network may similarly be a local area network (LAN), a wide area network, or any other suitable network. In some implementations, the second network is a secure internal network of a business or company. In such implementations, private or confidential information may be contained on the second network (e.g., stored in the database 112). Therefore, it may be important to ensure that malicious code does not compromise the second network 103 in a way that makes the private or confidential data accessible to an unauthorized third party. In certain implementations, networks 101 and 103 are interconnected. In some implementations, networks 101 and 103 comprise the same network. The links 105, 107, 109, and 111 can be wireless links, wired connections, or any other suitable connections.

The depicted database 112 can be any suitable database system, including the commercially available Microsoft Access database, and can be a local or distributed database system. The design and development of suitable database systems are described in McGovern et al., A Guide To Sybase and SQL Server, Addison-Wesley (1993). The database 112 can be supported by any suitable persistent data memory, such as a hard disk drive, RAID system, tape drive system, floppy diskette, or any other suitable system. The system depicted in FIG. 1 includes a database 112 that is separate from the computer workstation 110, however, it will be understood by those of ordinary skill in the art that in other embodiments the database 112 can be integrated into the computer workstation 110.

Figure 2:
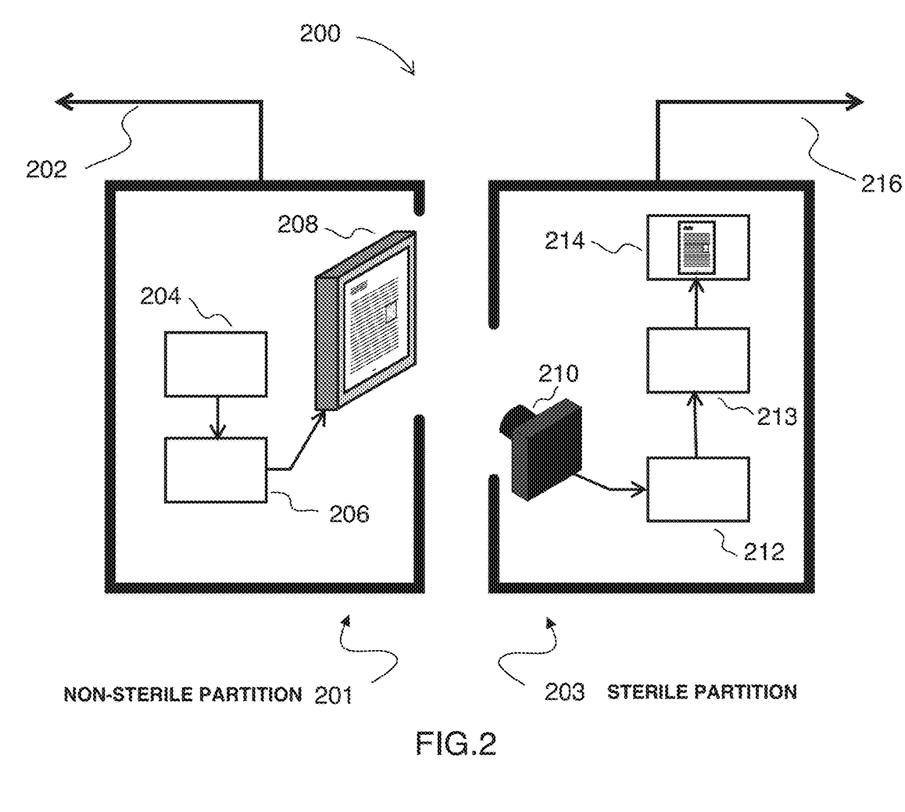
FIG. 2 depicts a diagram of an illustrative embodiment of a system for sterilizing email attachments in accordance with some embodiments of the disclosure.

FIG. 2 depicts a diagram of an illustrative embodiment of a system 200 for sterilizing email attachments in accordance with some embodiments of the disclosure. The system 200 includes a non-sterile partition 201 and a sterile partition 203. The non-sterile partition 201 includes a network link 202, a computer 204, computer programs 206 for execution on the computer 204, and a monitor display 208. The sterile partition 203 includes a visual input device 210, a computer 212, computer programs 213, output email and attachment data 214, and a network link 216.

In use, either by user action or automatic screening, an incoming email with an attachment may be directed to the non-sterile partition 201 of the system 200 and received by the computer 204. The computer 204 may use an email program, such as Thunderbird, IceWarp Server, Opera, and GroupWise, or any other suitable email program to open the incoming email. Upon the receipt of the email containing an attachment, the non-sterile partition 201 may identify and record the sender's email address, along with details of the attachment. Recorded details of the attachment can include a file type, file name, size, or any other suitable metadata.

The non-sterile partition 201 may display an indication that a new attachment has been received and is ready for processing. The indication may be provided using text, an indicator light, a barcode (or similar encoding) shown on the monitor display 208, or a simple electrical connection that cannot carry (possibly malicious) code. If a barcode or similar encoding is used, the barcode may encode the aforementioned metadata associated with the attachment.

Based on the type of file, the non-sterile partition 201 then may use the appropriate program such as Microsoft® Word, Microsoft® Excel, Microsoft® PowerPoint, PDF Viewer, or any other suitable computer software to open the attachment and display it on the monitor display 208 together with information such as the original recipient's email address and/or other identifying information, file type, number of pages, or any other suitable metadata. The non-sterile partition 201 can also archive the incoming email and attachment for later forensic use.

The sterile partition's computer 212 may use its visual input device 210 or a receiver of a simple electrical connection (not shown) that cannot carry (possibly malicious) code to periodically check the non-sterile partition 201 for an indication that there is a new attachment file ready to be processed. The visual input device 210 can be a scanner, digital camera, or any other suitable sensor. The visual input device 210 can generate a file in any format, such as the GIF, JPEG, TIFF, PBM, PGM, PPM, EPSF, X11 bitmap, Utah Raster Toolkit RLE, PDS/VICAR, Sun Rasterfile, BMP, PCX, PNG, IRIS RGB, XPM, Targa, XWD, possibly PostScript, and PM formats on workstations and terminals running the Window System or any image file suitable for import into the sterile partition 203.

The sterile partition's computer 212 then may use the visual input device 210 to capture an image of the document that is displayed on the non-sterile partition's monitor display 208. Using information indicating the file type that is received from the non-sterile partition 201, the sterile partition's computer 212 then may use the appropriate program or combination of programs to re-create the attachment from the original email in a form that is useful to the original recipient. Example programs that may be used to re-create the attachment include optical character recognition (OCR) programs (e.g., Tesseract, Open RTK, Type Reader, or any other suitable OCR programs), word processors (e.g., Microsoft® Word or Mac® Pages, or any other suitable word processors), image processing programs, spreadsheet editors (e.g., Microsoft® Excel or any other suitable spreadsheet editors), PDF Creator, or any other suitable program. An attachment that has been identified as an image, or other document that cannot be successfully processed by the OCR engine, can be processed by an image processing program and output as an image in a format such as JPG, TIFF, GIF, image PDF, or any other suitable image format.

The computer 212 of the sterile partition 203 then may consult the address of the original recipient, and package the "sterilized" attachment into an email, or store it and communicate to the original recipient through network link 216 that the sterilized attachment is available for retrieval. In this manner, the content of email attachments can be allowed into a corporate network, such as the network 103 in FIG. 1, to be opened and used without the possibility of passing on a virus, malware, or any other malicious or unwanted code. The whole process can be automated, fast, efficient and essentially transparent to the users.

The non-sterile computer 204 that performs the task of opening possibly harmful attachments may itself be vulnerable to being infected with malware. Therefore, in some implementations, the computer that performs the tasks on the non-sterile partition comprises one or more virtual computers running on a server on the non-sterile partition 201. In such implementations, after each attachment is opened, or after a specified number of conversions, the health of the non-sterile partition 201 can be examined (e.g., by means such as a checksum on its operating system and software programs) and if the virtual computer is found to have been compromised, then the non-sterile partition 201 can be erased and re-created from a saved iteration. Alternatively, the operating system and computer programs can be erased and re-written onto the virtual computer after each attachment is processed.

To streamline the process of reloading a virtual computer after an email is opened and its attachment rendered for viewing by the sterile partition, the virtual computer can be partitioned in whole or in part into read-only memory and read/write memory sections. Parts of the operating system and application code of computer 204 that would not be modified in the process of opening an email and rendering its attachment can be placed on read-only memory and thus be safe from malware infection. Sections of the computer's operating system and application code that would be modified in the process of opening an email and rendering its attachment may then be placed in read/write memory and deleted and replaced after a change is detected in a check sum, or after a selected number of operations. In this way, since a whole new virtual computer and application code does not need to be purged and rewritten each time, the process of clearing and recreating a virtual computer can be made more efficient.

Although FIG. 2 graphically depicts the non-sterile partition 201 and sterile partition 203 of the email sterilization mechanism 200 as functional block elements, it will be apparent to one of ordinary skill in the art that these elements can be realized as computer programs or portions of computer programs that are capable of running on a data processor platform to thereby configure the data processor platform as a system according to the invention.

Figure 3:
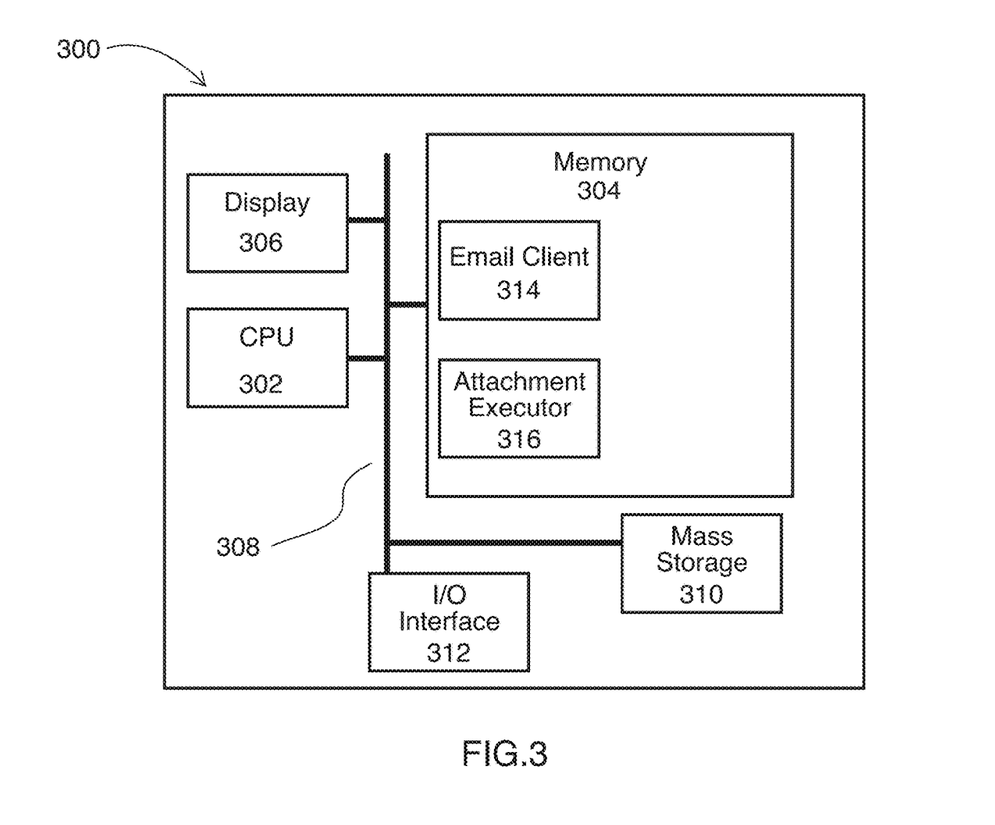
FIG. 3 depicts an illustrative embodiment of a schematic block diagram of a non-sterile partition in accordance with some embodiments of the disclosure.

FIG. 3 depicts an illustrative embodiment of a schematic block diagram of a non-sterile partition 300 in accordance with some embodiments of the disclosure. The non-sterile partition includes a CPU 302 connected by bus wire 308 to a memory 304, a display 306, a mass storage device 310, and an input/output interface 312. The input/output interface 312 is configured to allow the non-sterile partition 300 to communicate with a network, such as first network 101 of FIG. 1. The memory 304 includes an email client 314 and an attachment executor 316. The email client 314 allows the non-sterile partition 300 to receive emails from a network. The email client may comprise the computer program Thunderbird, IceWarp Server, Opera, and GroupWise, or any other suitable email program to open the incoming email. Upon the receipt of an email containing an attachment, the non-sterile partition 300 may use the email client to identify the sender's email address, along with details of the attachment. The details of the attachment can include a file type, file name, size, or any other suitable metadata. This information may be stored by the CPU 302 in mass storage 310.

Attachments detected by the email client 314 may be executed by an attachment executor 316. The attachment executor 316 may render any attachments into an image that may be displayed on the display 306. The execution of the attachments may also cause malicious code to be executed. However, since the non-sterile partition is connected to a sterile partition through an optical link, the effect of malicious code is isolated from the sterile partition.

Figure 4:
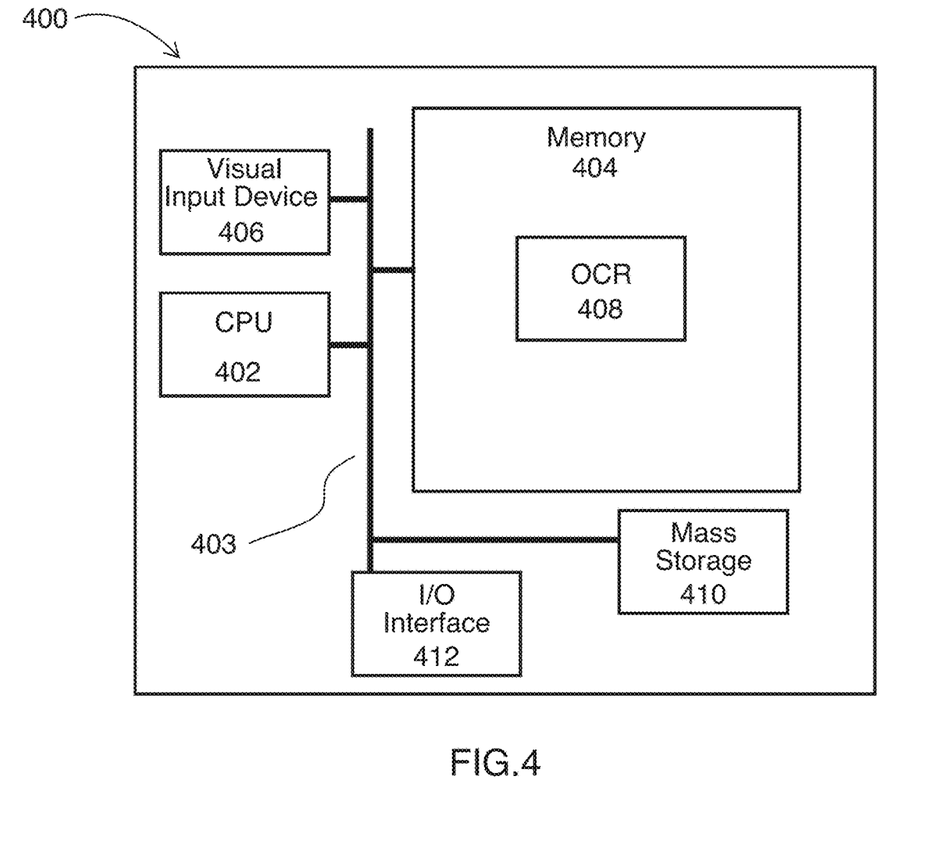
FIG. 4 depicts an illustrative embodiment of a schematic block diagram of a sterile partition in accordance with some embodiments of the disclosure.

FIG. 4 depicts an illustrative embodiment of a schematic block diagram of a sterile partition 400 in accordance with some embodiments of the disclosure. The sterile partition includes a CPU 402 connected by bus wire 403 to a memory 404, a visual input device 406, a mass storage device 410, and an input/output interface 412. The memory includes an optical character recognition mechanism 408. The visual input device 406 may receive an image, such as an image of contents of the display 306 of the non-sterile partition 300. The received image may be processed using the optical character recognition mechanism 408 to generate an editable data file. The input/output interface 412 connects the sterile partition 400 to a network, such as the second network 103 in FIG. 1. The input/output interface 412 can therefore be used to transmit the editable data file to the network.

Figure 5:
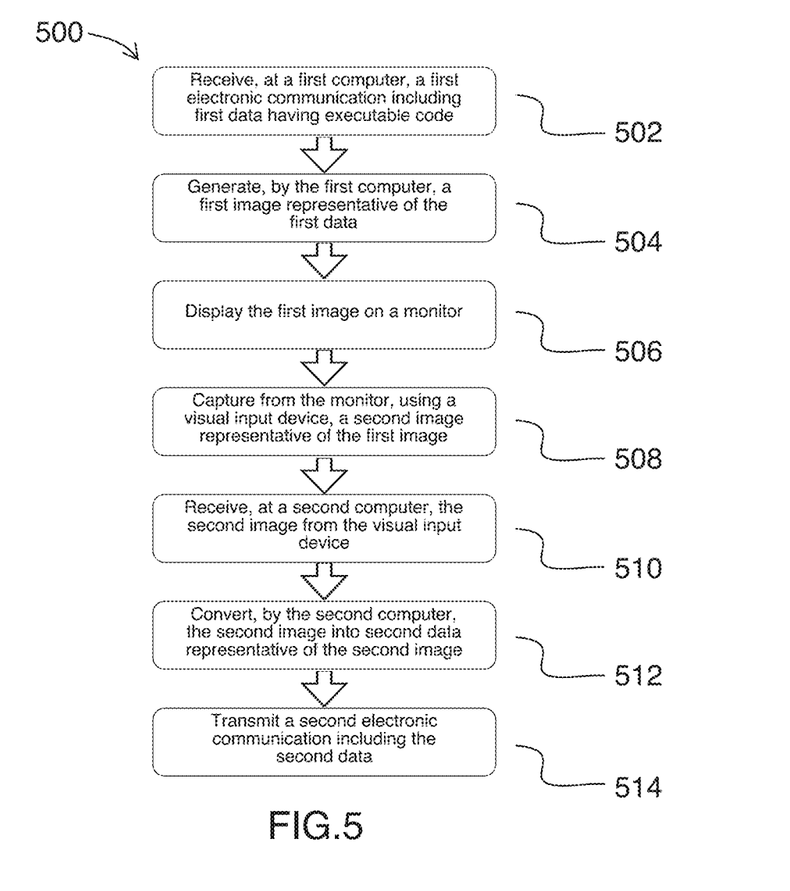
FIG. 5 depicts a flowchart of an illustrative embodiment for sterilizing email attachments in accordance with some embodiments of the disclosure.

FIG. 5 depicts a flowchart 500 of an illustrative embodiment for sterilizing email attachments in accordance with some embodiments of the disclosure. In step 502, a first electronic communication including first data having executable code is received at a first computer. The first computer may be the computer 204 of the non-sterile partition 201 of FIG. 2. In step 504, a first image representative of the first data is generated by the first computer. The first image is displayed on a monitor in step 506. In step 508, a second image representative of the first image is captured from the monitor using a visual input device. The second image from the visual input device is received at a second computer in step 510. In step 512, the second image is converted into second data representative of the second image by the second computer. In step 514, a second electronic communication including the second data is transmitted.

Figure 6:
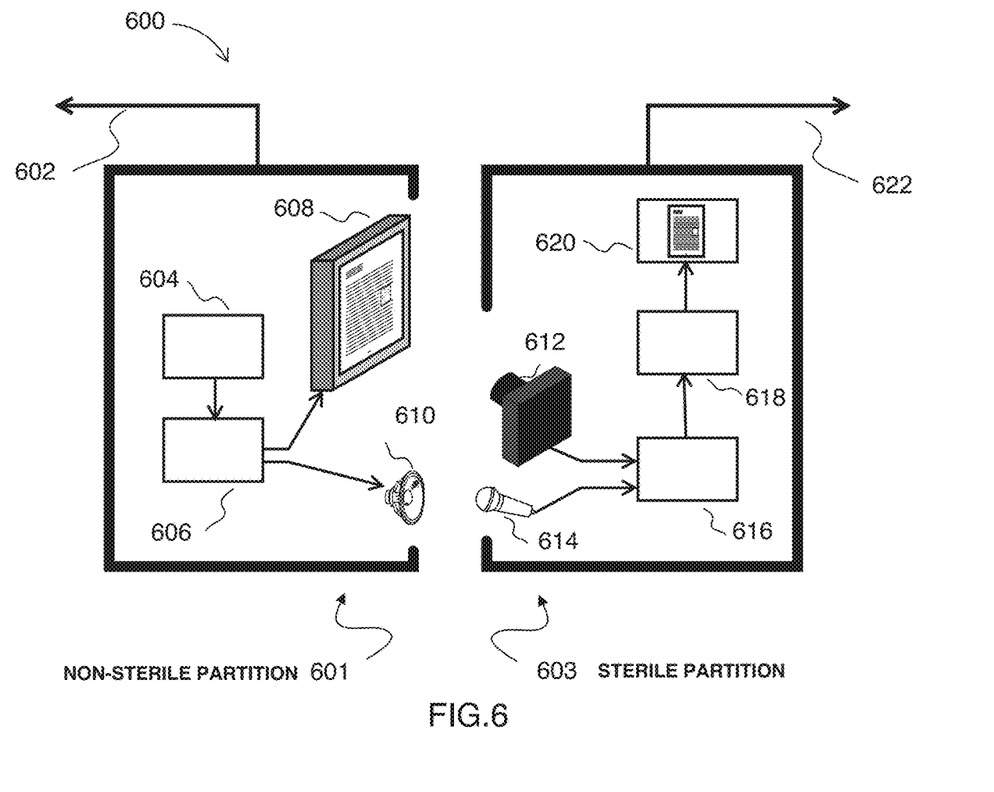
FIG. 6 depicts a diagram of an illustrative embodiment of a system for sterilizing audio in accordance with some embodiments of the disclosure.

FIG. 6 depicts a diagram of an illustrative embodiment of a system 600 for sterilizing audio in accordance with some embodiments of the disclosure. The system 600 is similar to the system 200 of FIG. 2. The system 600 includes a non-sterile partition 601 and a sterile partition 603. The non-sterile partition 601 includes a network link 602, a computer 604, computer programs 606 for execution on the computer 604, a monitor display 608, and a speaker 610. The sterile partition 603 includes a visual input device 612, a microphone 614, a computer 616, computer programs 618, output email and attachment data 620, and a network link 622.

In use, either by user action or automatic screening, an incoming email with an audio or video attachment may be directed to the non-sterile partition 601 of the system 600 and received by the computer 604. Similar to the computer 204 of system 200, the computer 604 may use an email program, such as Thunderbird, IceWarp Server, Opera, and GroupWise, or any other suitable email program to open the incoming email. Upon the receipt of the email containing an attachment, the non-sterile partition 601 may identify and record the sender's email address, along with details of the attachment. Recorded details of the attachment can include a file type, file name, size, or any other suitable metadata.

The non-sterile partition 601 may indicate that a new attachment has been received and is ready for processing. The indication may be provided by an audio signal (e.g., a beep or chime) generated by the speaker 610 or by a visual signal (e.g., using text, an indicator light, a barcode, or similar encoding) shown on the monitor display 608, or a simple electrical connection that cannot carry (possibly malicious) code.

Based on the type of file, the non-sterile partition 601 then may use the appropriate program such as a media player or an audio player (e.g., iTunes®, Windows Media Player®, RealPlayer®, or any other suitable computer software) to open the attachment. At the same time, the monitor display 608 may also display information such as the original recipient's email address and/or other identifying information, file type, number of pages, or any other suitable metadata. The non-sterile partition 601 can also archive the incoming email and attachment for later forensic use.

The sterile partition's computer 616 may use its visual input device 612 or microphone 614 to periodically check the non-sterile partition 601 for an indication that there is a new attachment file ready to be processed. When a new attachment file having audio is detected, the sterile partition's computer 616 may use the microphone 614 to capture an audio file of the data that may be played on the non-sterile partition's speaker 610. The speaker 610 can be a dynamic loudspeaker, piezoelectric speaker, magnetostatic loudspeaker, bending wave loudspeaker, or any other suitable sound generation device. The microphone 614 can be a condenser microphone, a dynamic microphone, a ribbon microphone, a carbon microphone, a piezoelectric microphone, a fiber optic microphone, a laser microphone, a MEMS microphone, or any other suitable audio input device. The microphone 614 can generate a file in any format, including uncompressed audio formats, such as WAV, AIFF, AU or raw header-less PCM; formats with lossless compression, such as FLAC, Monkey's Audio, TTA, ATRAC Advanced Lossless, Apple Lossless (.m4a), MPEG-4 SLS, MPEG-4 ALS, MPEG-4 DST, Windows Media Audio Lossless, and Shorten (SHN); or formats with lossy compression, such as MP3, Vorbis, Musepack, AAC, ATRAC and Windows Media Audio Lossy (WMA lossy); or any other suitable audio format.

If the attachment includes a video, the video can also be transmitted by the monitor display 608 of the non-sterile partition 601 and received by the visual input device 612. Simultaneously, the audio can be transmitted from the speaker 610 of the non-sterile partition 601 and received by the microphone 614 of the sterile partition 603. The video can be recreated from the video and audio signals received at the visual input device 612 and microphone 614, respectively, using the computer 616. The computer 616 may use a video compiler or any other appropriate program or combination of programs to re-create the video file in a form that is useful to the original recipient. The video file re-created by the sterile partition can include AAF, 3GP, Animated GIF, ASF, MPEG-4, Windows Media Video (WMV), Advanced Video Codec High Definition (AVCHD), AVI, CAM, DAT, DSH, Flash video (FLV), M1V MPEG-1, M2V MPEG-2, FLA, FLR, SOL, M4V, WRAP, MNG, QuickTime (.mov), QTCH, MPEG (.mpeg, .mpg, .mpe), MPEG-4 Part 14 (MP4), MXF, Ogg, RM, SVI, SMI, Macromedia Flash (SWF), WMV, YUV, or any other suitable video format.

The computer 616 of the sterile partition 603 then may consult the address of the original recipient, and package the "sterilized" attachment into an email, or store it and communicate to the original recipient through network link 622 that the sterilized attachment is available for retrieval. In this manner, the content of email attachments can be allowed into a corporate network, such as the network 103 in FIG. 1, to be opened and used without the possibility of passing on a virus, malware, or any other malicious or unwanted code. The whole process can be automated, fast, efficient and essentially transparent to the users.

Although FIG. 6 graphically depicts the non-sterile partition 601 and sterile partition 603 of the email sterilization mechanism 600 as functional block elements, it will be apparent to one of ordinary skill in the art that these elements can be realized as computer programs or portions of computer programs that are capable of running on a data processor platform to thereby configure the data processor platform as a system according to the invention.

The depicted non-sterile partition 300 and sterile partition 400 can be implemented using conventional data processing platforms such as an IBM PC-compatible computer running the Windows operating systems, or a SUN workstation running a UNIX operating system. Alternatively, the systems can comprise dedicated processing systems that include embedded programmable data processing systems that can include an image generation mechanism, image capture mechanism, and image recognition mechanism.

The email sterilization mechanism can also be realized as a software component operating on a conventional data processing system such as a UNIX workstation. In that embodiment, the email sterilization mechanism can be implemented as a C language computer program, or a computer program written in any high level language including C++, FORTRAN, Java or BASIC. See The C++ Programming Language, 2nd Ed., Stroustrup Addison-Wesley.

Additionally, in an embodiment where microcontrollers or DSPs are employed, the email sterilization mechanism 200 can be realized as a computer program written in microcode or written in a high level language and compiled down to microcode that can be executed on the platform employed.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stores data across different types of media, such as flash media and disc media. Optionally, the different media may be organized into a hybrid storage aggregate. In some embodiments different media types may be prioritized over other media types, for example flash media may be prioritized to store data or supply data ahead of hard disk storage media or different workloads may be supported by different media types, optionally based on characteristics of the respective workloads. Additionally, the system may be organized into modules and supported on blades (e.g., blade servers) configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further include software instructions for performing embodiments described herein. Included in the programming (software) of the general-purpose/specialized computer or microprocessor are software modules for implementing some embodiments.

Those skilled in the art will know or be able to ascertain, using no more than routine experimentation, many equivalents to the embodiments and practices described herein. For example, optical data may be transmitted without displaying an image on a monitor (e.g. by receiving optical data directly from VGA monitor cables). Also, although depicted as connected to separate networks, the non-sterile and sterile partitions can be connected to the same network. It will also be understood that the systems described herein provide advantages over the prior art including the prevention of malware transmission and the protection of internal computer networks of companies that frequently open email attachments from unknown senders. Accordingly, it will be understood that the invention is not to be limited to the embodiments disclosed herein.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A system for sterilizing data sent through electronic messages, the system comprising:
   first computing circuitry configured to:
   receive a first electronic communication including first data having executable code;
   generate optical data representative of the first data by capturing an image representative of the first data that is displayed on a monitor associated with the first computing circuitry;
   determine whether a virtual computer associated with the first computing circuitry has been infected with malware; and
   in response to determining that the virtual computer associated with the first computing circuitry has been infected with malware, erase and reload a portion of the virtual computer associated with the first computing circuitry; and
   second computing circuitry configured to:
   receive the optical data from the first computing circuitry;
   convert the optical data into second data representative of the optical data; and
   transmit a second electronic communication that includes the second data and omits the first data.

2. The system of claim 1, wherein generating the optical data comprises generating the optical data in a format readable by a monitor.

3. The system of claim 1, wherein receiving the optical data from the first computing circuitry comprises receiving the optical data from an analog communications link.

4. The system of claim 3, wherein receiving the optical data through the analog communications link comprises receiving the optical data through a Video Graphics Array (VGA) cable.

5. The system of claim 1, wherein converting the optical data into the second data representative of the optical data comprises converting the optical data into the second data using at least one of optical character recognition and an image processing program.

6. The system of claim 1, wherein the first computing circuitry is further configured to transmit to the second computing circuitry an indication that the first electronic message was received and is ready for conversion, and wherein converting the optical data into the second data representative of the optical data comprises converting the optical data into the second data representative of the optical data after receiving the indication that the first electronic message was received and is ready for conversion.

7. The system of claim 1, wherein the optical data further comprises data representative of at least one of a sender's electronic message address, a file type, a file name, and a file size, and wherein the second computing circuitry is further configured to determine how to convert the optical data into the second data representative of the optical data and to which electronic message address to transmit the second electronic communication based on the data representative of at least one of the sender's electronic message address, the file type, the file name, and the file size.

8. The system of claim 1, wherein determining whether the first computing circuitry has been infected with malware comprises determining whether the first computing circuitry has been infected with malware when at least one of:
   a fixed time period has passed,
   a failed checksum has been computed, and
   an electronic communication has been received.

9. A method for sterilizing data sent through electronic messages, the method comprising:
   receiving, at first computing circuitry, a first electronic communication including first data having executable code;
   generating, by the first computing circuitry, optical data representative of the first data by capturing an image representative of the first data that is displayed on a monitor associated with the first computing circuitry;
   determining, by the first computing circuitry, whether a virtual computer associated with the first computing circuitry has been infected with malware; and
   in response to determining that the virtual computer associated with the first computing circuitry has been infected with malware, erasing and reloading a portion of the virtual computer associated with the first computing circuitry;
   receiving, at second computing circuitry, the optical data from the first computing circuitry;
   converting, by the second computing circuitry, the optical data into second data representative of the optical data; and
   transmitting, by the second computing circuitry, a second electronic communication that includes the second data and omits the first data.

10. The method of claim 9, wherein generating the optical data comprises generating the optical data in a format readable by a monitor.

11. The method of claim 9, wherein receiving the optical data from the first computing circuitry comprises receiving the optical data from an analog communications link.

12. The method of claim 11, wherein receiving the optical data through the analog communications link comprises receiving the optical data through a Video Graphics Array (VGA) cable.

13. The method of claim 9, wherein converting, by the second computing circuitry, the optical data into the second data representative of the optical data comprises converting the optical data into the second data using at least one of optical character recognition and an image processing program.

14. The method of claim 9, further comprising transmitting to the second computing circuitry, by the first computing circuitry, an indication that the first electronic message was received and is ready for conversion, and wherein converting, by the second computing circuitry, the optical data into the second data representative of the optical data comprises converting the optical data into the second data representative of the optical data after receiving the indication that the first electronic message was received and is ready for conversion.

15. The method of claim 9, wherein the optical data further comprises data representative of at least one of a sender's electronic message address, a file type, a file name, and a file size, and further comprising determining, by the second computing circuitry, how to convert the optical data into the second data representative of the optical data and to which electronic message address to transmit the second electronic communication based on the data representative of at least one of the sender's electronic message address, the file type, the file name, and the file size.

16. The method of claim 9, wherein determining, by the first computing circuitry, whether the first computing circuitry has been infected with malware comprises determining whether the first computing circuitry has been infected with malware when at least one of:
   a fixed time period has passed,
   a failed checksum has been computed, and
   an electronic communication has been received.

* * * * *